United States Patent
Sheehy et al.

(10) Patent No.: US 7,203,745 B2
(45) Date of Patent: Apr. 10, 2007

(54) METHOD OF SCHEDULING HOSTS FOR SOFTWARE UPDATES IN A DISTRIBUTED COMPUTER NETWORK

(75) Inventors: Justin J. Sheehy, Ithaca, NY (US); F. Thomson Leighton, Newtonville, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 508 days.

(21) Appl. No.: 10/448,160

(22) Filed: May 29, 2003

(65) Prior Publication Data

US 2004/0243996 A1 Dec. 2, 2004

(51) Int. Cl.
G06F 15/173 (2006.01)
G06F 9/445 (2006.01)
G06F 9/44 (2006.01)
G06F 17/00 (2006.01)

(52) U.S. Cl. .............. 709/223; 709/226; 717/176; 717/171; 706/45

(58) Field of Classification Search .............. None
See application file for complete search history.

(56) References Cited

U.S. PATENT DOCUMENTS

| 5,996,073 | A | 11/1999 | Lee et al. | |
|---|---|---|---|---|
| 6,108,703 | A | 8/2000 | Leighton et al. | |
| 6,990,660 | B2 * | 1/2006 | Moshir et al. | 717/171 |
| 7,007,067 | B1 * | 2/2006 | Azvine et al. | 709/206 |
| 2002/0157089 | A1 * | 10/2002 | Patel et al. | 717/178 |
| 2003/0149735 | A1 | 8/2003 | Stark et al. | |
| 2003/0217171 | A1 | 11/2003 | Von Stuermer et al. | |
| 2004/0015833 | A1 * | 1/2004 | Dellarocas et al. | 717/106 |
| 2004/0143830 | A1 | 7/2004 | Gupton et al. | |
| 2005/0080801 | A1 | 4/2005 | Kothandaraman et al. | |

OTHER PUBLICATIONS

Leighton, A Graph Coloring Algorithm for Large Scheduling Problems, Journal of Research of the National Bureau of Standards, vol. 84, No. 6, Nov. Dec. 1979.
Klotz, Graph Coloring Algorithms, 1999.

* cited by examiner

*Primary Examiner*—Hoang-Vu Anthony Nguyen-Ba
(74) *Attorney, Agent, or Firm*—David H Judson

(57) ABSTRACT

A method of and system for managing installs to a set of one or more field machines in a distributed network environment. In an illustrative embodiment, the system includes at least one change coordinator server that includes a database with data identifying a current state of each field machine, and a change controller routine for initiating a given control action to initiate an update to the current state on a given field machine. In particular, the change controller routine may include a scheduling algorithm that evaluates data from the database and identifies a set of field machines against which the given control action may be safely executed at a given time. At least one install server is responsive to the change controller routine initiating the given control action for invoking the update to the current state on the given field machine.

14 Claims, 3 Drawing Sheets

METHOD OF SCHEDULING HOSTS FOR SOFTWARE UPDATES IN A DISTRIBUTED COMPUTER NETWORK

RELATED CASE

This application is related to commonly-owned U.S. Ser. No. 10/445,686, filed May 27, 2003, titled "Method and System For Managing Software Installs In A Distributed Computer Network."

BACKGROUND OF THE INVENTION

1. Technical Field

The present invention relates generally to distributed computer networks and the management of such networks.

2. Description of the Related Art

Machines and collections of machines are defined by their state. A significant and complex portion of this state is the configuration that drives the behavior of the components running on those machines and interacting with those machines. A distributed computing environment typically implements techniques that attempt to provide a consistent mechanism for managing and changing both machine states and the configuration of machines and collections of machines.

A guiding principle is to drive the state and configuration of machines to a desired state. When possible, this should be done in a closed-loop fashion to avoid drift between machines and to maintain consistency across the network. For example, even if a machine misses a software install, the following install should bring it up to a consistent and correct state. Minimizing drift and maintaining consistency and repeatability is important for allowing a network with a large number of machines to be managed reliably and, optimally, preferably without or with minimal human intervention. If machine states are not reasonably consistent and predictable, assuring the quality of changes becomes an impossible task, as there may be a massive number of permutations to defend against.

Moreover, even when the network is not intentionally being kept in a heterogeneous state, there will always be some heterogeneity. Changes to the network are never atomic. It takes time for installs and configuration updates to propagate across the network. In many cases, this is intentional (when installs and configuration changes are staged) and in other cases it is a result of the need to coordinate changes so that only a portion of the network is undergoing an install at any one time. There are also straggler machines, often due to connectivity problems during an install or due to other install failures. There are other cases where multiple versions of some software are intentionally running on different parts of the network at the same time, sometimes for extended periods of time. Whatever the reason, the software and configuration state of the network can be assumed to be heterogeneous at any point in time. Different machines will not only have different states, they may also have different perceptions of the states of other machines. Having every machine constantly updating its configuration and state to reflect the heterogeneity is a very hard problem. It is desirable to track heterogeneity where necessary, but just as importantly, it is desirable to make sure that everything is robust enough to be tolerant of heterogeneity in cases where fully tracking and responding to it is not possible.

Consider the need to perform configuration and software installs across a large distributed computer network. In such networks, it is known to use an application (e.g. NetDeploy™ deployment utility) that involves having humans running a script that makes secure (e.g., SSH) connections to a specified list of machines, copies out a configuration file and an archive of software (e.g., a tarball, an archive of files created with the Unix® tar utility), and then invokes a host setup process on the machine to configure and install the software. This means that machines only change states when a human actively runs the install process to change the state of an individual machine or group of machines. Changing the network configuration or deploying new software involves running an install against all of the machines in the network. This is a time-intensive process for a human, and stragglers (machines that miss an install) will continue to run with old software and an old view of the world.

The present invention addresses these and other associated problems of the prior art.

BRIEF SUMMARY OF THE INVENTION

In an embodiment, a method of and system for managing installs to a set of one or more field machines in a distributed network environment is described. In this illustrative embodiment, the system includes at least one change coordinator server that includes a database with data identifying a current state of each field machine, and a change controller routine for initiating a given control action to initiate an update to the current state on a given field machine. In particular, the change controller routine includes a scheduling algorithm that evaluates data from the database and identifies a set of field machines against which the given control action may be safely executed at a given time. At least one install server is responsive to the change controller routine initiating the given control action for invoking the update to the current state on the given field machine.

Generally, the scheduling algorithm carries out a method that schedules field machines (i.e., hosts) to timeslots to enable a given control action, such as an install, to take place. Typically, given hosts are associated with one or more potentially overlapping constraint sets and/or have given precedent relationships. A "constraint set" (sometimes called a "rule") may be created when any group of hosts are interdependent (typically in a direct manner) or where any group of hosts provides necessary redundancy (e.g., for safety purposes). A "precedent relationship" as the name applies typically is where particular host(s) must be installed before other hosts, e.g., to ensure proper system operation, process continuity, or the like. In an illustrative embodiment, the method begins by maintaining a given state of a set of hosts. Then, the method generates a first rank order of the hosts by assigning to each host a cumulative value of all constraint sets in which that host is contained. Thereafter, the method alters the first rank order to accommodate precedent relationships, if any, to generate a second rank order of the hosts. A given heuristic is then executed against the second rank order to assign hosts into a set of one or more timeslots, preferably in a greedy fashion. Thus, for example, hosts are pulled from the second rank order and pushed into a first timeslot $t_1$ until a given constraint is violated.

The foregoing has outlined some of the more pertinent features of the invention. These features should be construed to be merely illustrative. Many other beneficial results can be attained by applying the disclosed invention in a different manner or by modifying the invention as will be described.

DETAILED DESCRIPTION OF AN EMBODIMENT

Figure 1:
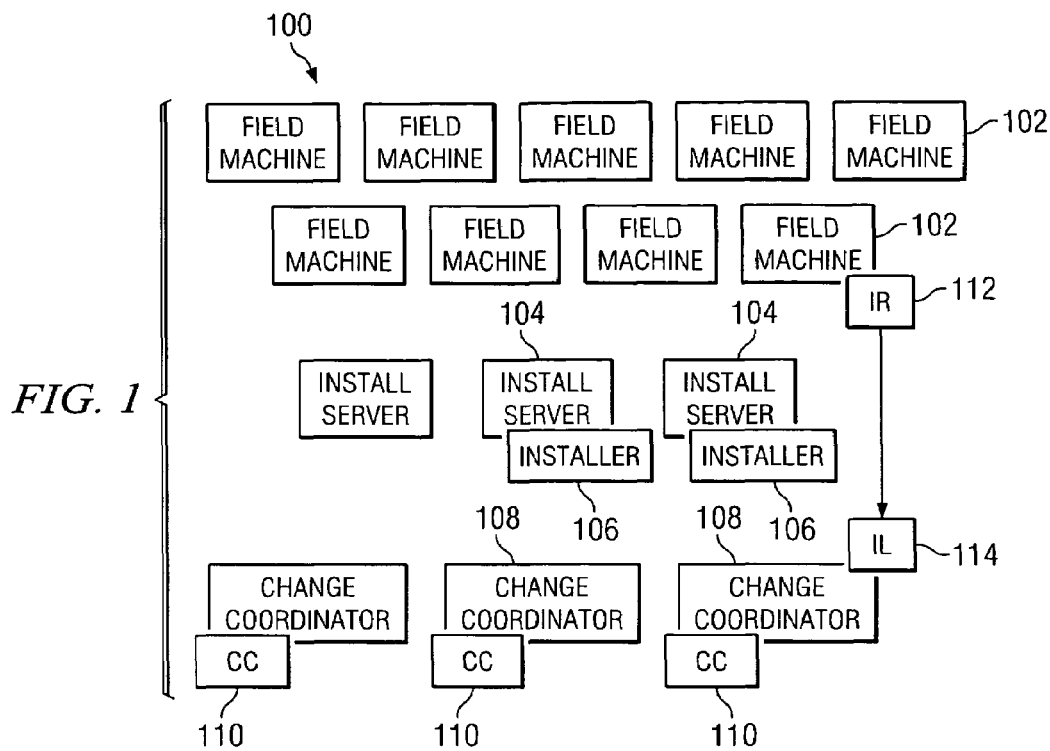
FIG. 1 is a block diagram of a distributed computing environment in which the software management system of the present invention may be implemented.

As seen in FIG. 1, a distributed computing environment 100 in which the software management system of the invention may be implemented includes a set of field machines 102 that facilitate or provide a given operation, such as Internet content delivery. How a particular field machine is used is not particularly relevant to the present invention, as the invention is directed generally to how software gets installed on that machine remotely, as opposed to the particular function of that software. Generalizing, a field machine 102 is any machine or "host" installable by an application deployment routine (e.g., NetDeploy) and identifiable through information residing in a network configuration file. As seen in FIG. 1, the inventive management system also includes a set of Install Server(s) 104, each of which is a host running an Installer component 106. The management system of the invention also includes a set of Change Coordinator(s) 108, each of which is a host running a Change Coordinator (CC) component 110. Generalizing, the Installer 106 and Change Coordinator 110 components comprise software code (or its equivalent) for carrying out various functions as will be described below.

The software management system has a basic design that is preferably a two-layered one. A first or "inner" layer consists of the Change Coordinator hosts 108, which hosts are responsible for complex tasks such as maintaining a database of host states, determining which hosts should be installed at what time, and generally forming the core of the system. Preferably, Change Coordinators 108 communicate with Install Servers 104 over a given communications channel, and with clients via HTTPS. The Change Coordinators receive frequent reports about host states via processes that are referred to herein for convenience as an Install Reporter (IR) 112 and an Install Listener (IL) 114. As will be described below, IR typically runs on a field machine 102, and IL typically runs on a CC host 108, although it can run on any field machine 102 as well. Preferably, Change Coordinator hosts communicate with all other Change Coordinators frequently, if not constantly, to keep their databases synchronized.

The second or "outer" layer consists of the Install Servers 104, which machines may be stateless, existing partially to provide a barrier between the Change Coordinators and the rest of the network. Preferably, Change Coordinators are contacted by field machines, which provide their install status. Alternatively, field machines contact Install Servers with this information, which is then passed on to Change Coordinators. Install Servers are instructed by the Change Coordinators to install field machines, and then perform those installs, typically using application deployment utilities. The Install Servers preferably communicate with Change Coordinators over a given communication channel, and they preferably receive reports from field machines and trigger field installs using an SSH channel.

As one of ordinary skill in the art will appreciate, this model is essentially "pull-triggered," as most installs are triggered by an action beginning on the machine being installed.

Figure 2:
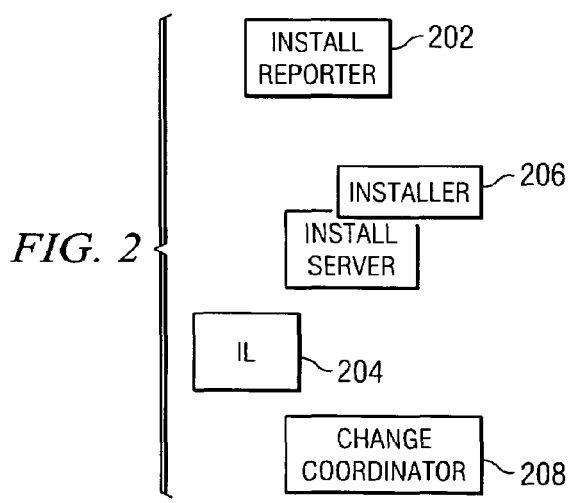
FIG. 2 is a block diagram of the main processing components used in the software management system of the present invention.

As seen in FIG. 2, the system 200 comprises four major process components that have been previously identified: an Install Reporter (IR) 202, an Install Listener (IL) 204, an Installer 206, and a Change Coordinator (CC) 208. IL 204 may be part of CC 208, or a separate component. The IR component 202 is very simple. It is run regularly on field machines. A convenient mechanism for doing this (in a Unix®-based environment) is to use a Unix® cron, which is a program that enables users to execute commands or scripts automatically at a specified time/date. The IR component 202 reads local disk to determine the release that the host is currently installed with. The IR component 202 then opens a connection (e.g., via UDP (User Datagram Protocol)) to the hostname that resolves to the set of machines running an Install Listener process (IL) 204. The IR component 202 then transmits its release information (and, perhaps its IP address) over that connection using a convenient protocol.

The IL component 204 preferably is an always-running server. It can run on any field machine, but this component preferably runs initially on the CC hosts for simplicity. The IL component 204 receives reports from field machines running IR component 202. Communication is preferably one-way, and the IL component 204 is not expected to send any data back to the machine sending data. Data coming in to the IL component 204 is then fed outward to the Installer component 206 running on that machine.

The Installer 206 is the component whose role is to directly invoke installation of software onto field machines. This component receives data about field machines from the IL component 204. It passes most of this data on to the Change Coordinator system. When directed to do so, the Installer 206 invokes the installation of software onto field machines. In an illustrated embodiment, the machines are servers in a content delivery network (CDN), although this is not a limitation of the present invention, as previously noted.

The CC component 208 is the primary control mechanism in the system. It maintains a local database with a great deal of information about the known and desired states of field machines. It receives this information from multiple sources including the Install Servers, IL, other distributed data collection systems, and other network configuration files and release definitions. The CC component 208 maintains communications with Installer processes 206 on Install Servers, and it directs them to drive installs at appropriate times. These installs and their timing are determined by rules to maintain stability of the network. The engine for managing these rules is a part of the CC component 208 and will be described below. The CC component 208 may also provide direct human interaction through an appropriate user interface. In particular, it provides an interface that can be used to control the operating parameters of the CC process.

Preferably, CC component 208 speaks HTTPS to requesting clients.

Figure 3:
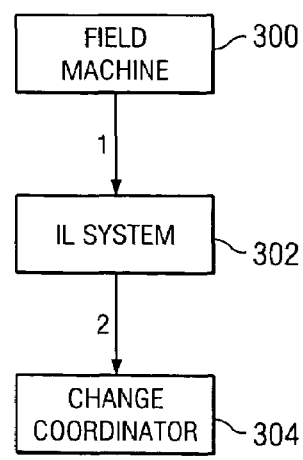
FIG. 3 is a representative operational sequence when the field machine does not require an install.

FIG. 3 illustrates a representative operational sequence when the field machine does not require an install. The most frequently occurring sequence of events occurs as follows. A field machine 300 invokes IR (e.g., out of Unix cron), which at step (1) sends its label to an IL machine 302. The identity of the IL machine 302 preferably is determined by looking up a DNS name that resolves to some set of hosts running IL. The particular DNS strategy is not critical. An arbitrary host's IL process receives this report. At step (2), the field machine's IP address and current label are passed along to the Change Coordinator host 304 that the IL host is then talking to at the moment. This Change Coordinator consults its database and determines that the field machine does not currently require an install.

Figure 4:
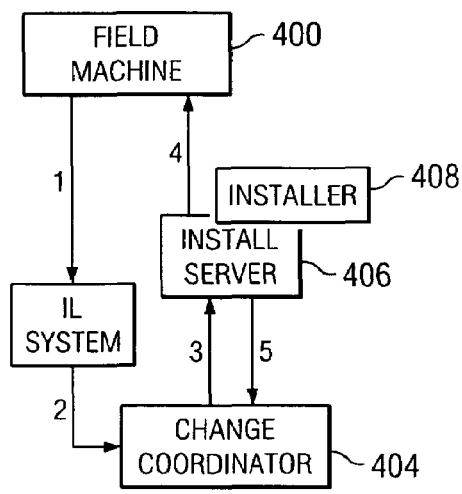
FIG. 4 illustrates a representative operational sequence when the field machine does need an install.

FIG. 4 illustrates a representative operational sequence when the field machine does need an install. Steps (1)–(2) of FIG. 3 are repeated. Here, however, the Change Coordinator 404 determines what software and configuration the field machine should have and, at step (3) instructs (3) the Installer 408 process running on the Install Server 406 to install the host to match that data. The installer 408 queues the install and, at step (4), installs the field machine 400. Upon completion of the install, at step (5) Installer 408 reports the status (success, failure, error messages, and so forth) back to the Change Coordinator.

Figure 5:
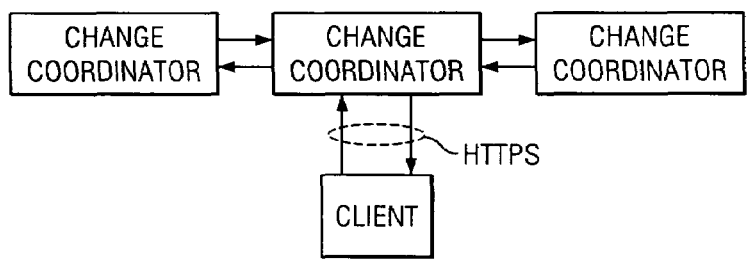
FIG. 5 illustrates a preferred way in which ordinary control of the system is performed.

FIG. 5 illustrates a preferred way in which ordinary control of the system is performed. As login access to the Install Servers and Change Coordinators preferably is tightly controlled, normal operations are performed over an HTTPS connection to the CC process on one of the Change Coordinators. As all Change Coordinators may communicate with all other Change Coordinators, and all Install Servers may communicate with one Change Coordinator, control messages can easily propagate to where they are needed.

Figure 6:
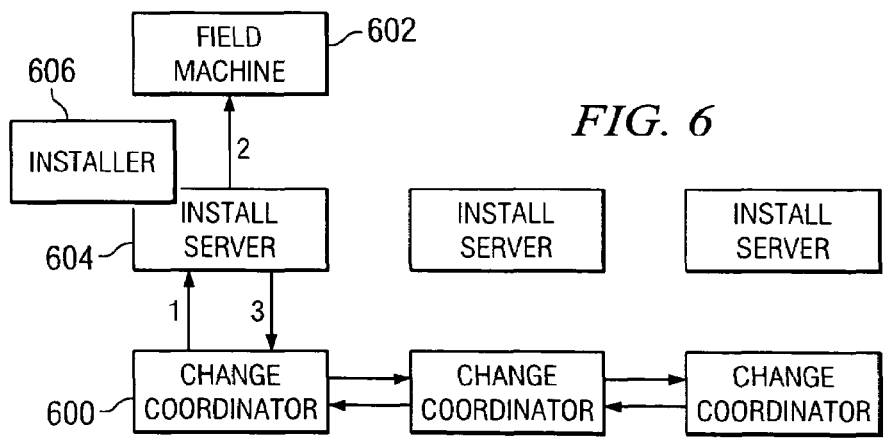
FIG. 6 illustrates how new machines (e.g., those not yet running IR) are brought into the management system.

FIG. 6 illustrates how new machines (not yet running IR) are brought into the management system. A Change Coordinator 600 notes that it has not heard from a given field machine 602 in an unacceptably long period of time and, at step (1), directs an Install Server 604 to make sure that the given host is brought up-to-date if possible. The Installer 606 queues that install and, at step (2), the Installer installs the field machine 602. Upon completion of the install, at step (3), the Installer reports the status (success, failure, error messages, and so forth) back to the Change Coordinator.

Change Coordinator Component Design

As noted above, the CC component is the primary controller for the larger set of components making up the full software management system. The main roles of this component include: performing as the communications hub of the whole software management system, driving a scheduling engine for determining the eligibility for installation of field machines, maintaining tables in a distributed data store, providing the interface to that data store for other system components, publishing install-related information into a distributed query mechanism for network-monitoring purposes, and maintaining network communications with other CC hosts to provide a reliable distributed core for the software management system.

Figure 7:
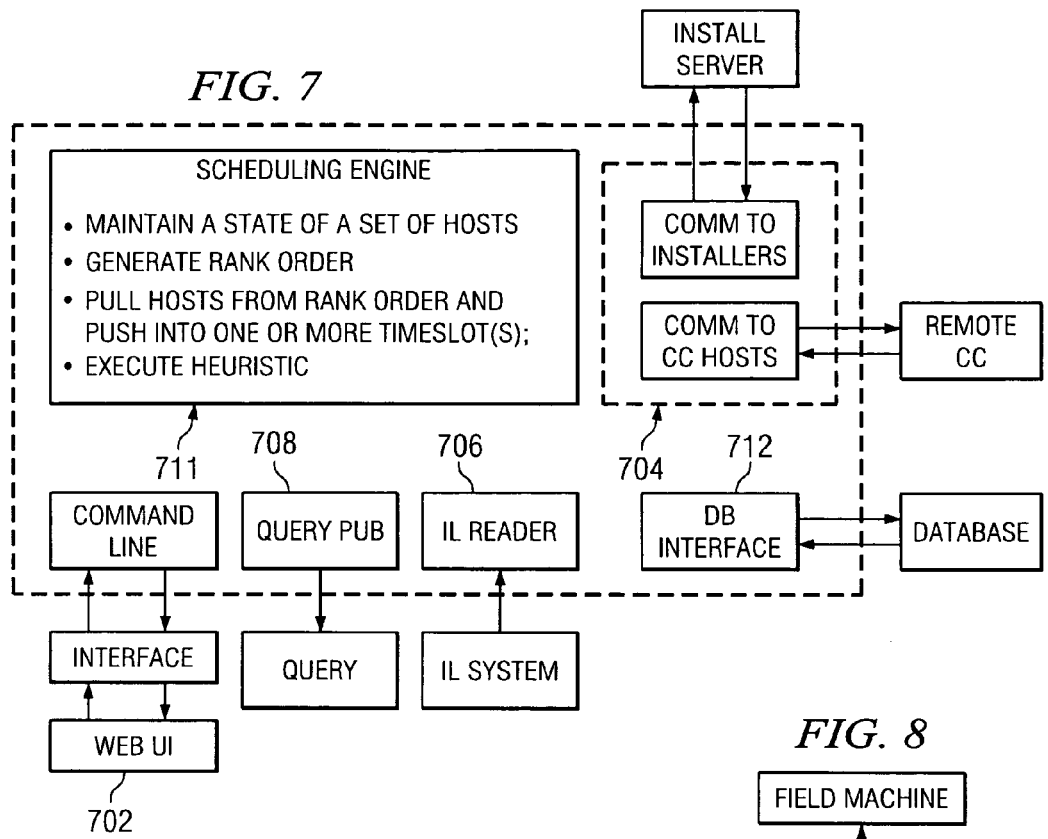
FIG. 7 illustrates a representative Change Coordinator (CC) component of the software management system of the present invention.

As seen in FIG. 7, the CC component 700 preferably has multiple subsystems comprising: an external UI 702, a communication subsystem 704 for talking to Install Servers and other Change Coordinators, a reader mechanism 706 for acquiring data from IL, a mechanism 708 for publishing data for distributed data collection, a scheduling engine 710, and a data store interface 712. Each of these components is described below.

External UI

The user interface preferably has multiple layers, usable at any layer by an appropriately authorized user. A user logged in to the CC host may use command line tools locally to directly affect the CC's behavior. Instead, appropriate remote access mechanisms may be used to enable a properly authorized user to drive the CC command line from a remote location. The graphical UI is a wrapper around these tools, providing the primary and suggested interface for all common operations. This will be the means by which all normal control of the system is performed. Information passing through this interface, for example, may include: issuing commands to start installing a new release, issuing commands to pause, stop, or resume all installs, submitting information about the parameters of a new release, verifying a release's readiness for a given release phase, or issuing commands to modify operational configuration of the system.

Communication Subsystem for Talking to Installers

Each active Change Coordinator preferably maintains an open communication channel with at least one Installer. The protocol used between hosts/components in this situation is the Change Coordinator Control Protocol (CCCP). CCCP preferably uses a secured, encrypted TCP connection for transport, and it provides a simple remote object access protocol with an XML-RPC style of encoding. This protocol may also be used to enable Change Coordinators to talk to each other, for example, to detect network partitions, to synchronize databases, and to elect a leader.

IL Communication Subsystem

The output mechanism and locking protocol by which data gets from IL to the CC component is documented below. Preferably, this data will be read in continuously and used to update the CC's backend data store.

Publisher Mechanism

To facilitate monitoring and management, the CC will publish data into a distributed query mechanism.

Scheduling Engine

This engine is used to determine: which hosts are out of date and should be installed; and which hosts are safe to install (or possibly suspend) at any given moment, taking into given criteria, e.g., region bandwidth, machine interdependencies, suspend states, and the like. Several factors may go into these decisions, including several hard-coded rules in addition to the information presented to the CC via the external UI.

The scheduling engine typically will do its work by processing data in the shared database. When possible, it is preferable that rules are static, but some rules may also rely on changing near-real-time data. Preferably, there are two parts to each rule: content and description. The content of a rule is the list (or lists) of IP addresses that to which the rule applies. This content defines the set to which the rule applies. These lists may be generated statically from a configuration file that describes the install. This approach may not be sufficient for all rules, and are working on a means to generate the content dynamically from the distributed query system and perhaps other sources as well.

The description of a rule preferably takes one of the following three forms: no more than N (or N %) of the hosts in this set may be installed at one time; none of the hosts in this set may be installed until all of the hosts in some arbitrary other set are installed; none of the hosts in this set may be installed until a specific internal flag has been set.

A preferred algorithm used for scheduling and satisfying the rules is detailed in the following section.

Preferably, the scheduling engine internally publishes the hosts that have been determined to need an install and that are safe to install at the current time. The install-driving module of the CC will be the client of this information, taking machines from this pool whenever installation resources are available. Further details of this process are now described.

The scheduling algorithm is designed to accommodate that different hosts in the distributed network environment may have different functions or interdependencies, or that it may not be desirable to do installs on all hosts (or even a subset) at a given time. Thus, for example, certain hosts may be critical to the operation of other hosts, or to the distributed network as a whole and, thus, the scheduling algorithm must be flexible, yet still robust. According to the present invention, it is assumed that there are a plurality of hosts that need installs, but that given hosts are associated with one or more potentially overlapping constraint sets and/or have given precedent relationships. A "constraint set" (sometimes called a "rule") will be created when any group of hosts are interdependent (typically in a direct manner) or where any group of hosts provides necessary redundancy (e.g., for safety purposes). There may be other constraint sets defined. A "precedent relationship" as the name applies is where particular host(s) must be installed before other hosts, e.g., to ensure proper system operation, process continuity, or the like. The scheduling algorithm preferably takes constraint set(s) and precedent relationships (if any) into consideration as follows.

Initially, the algorithm generates a first rank order of the hosts by assigning to each host a cumulative value of all constraint sets in which that host is contained. Then, the algorithm alters the first rank order to accommodate precedent relationships, if any, to generate a second rank ordering of the hosts. If there are no precedent relationships, the second rank order is the same as the first rank order. After the second rank order is generated, the scheduling algorithm implements a given heuristic. Thus, in a representative embodiment, the given heuristic assigns hosts into a set of one or more timeslots in a greedy fashion, i.e., pull hosts off the second rank ordering and continue pushing them into timeslot $t_1$ until a given constraint is violated, then continue with timeslot $t_2$, and so on.

In a given operating environment, the scheduling algorithm is run in a production mode, such that when timeslot 1 is filled, the routine stops. Thus, in this mode, given the current database (the install state of all hosts, viz., the field machines) and given the set of current rules (constraints), the algorithm returns the set of field machines that it is safe to execute a control action against at this particular time (i.e., at a given point in time or at points in time during the timeslot). At this point, the change coordinator instructs the install servers to install the hosts that have been pushed into the timeslot. In an alternative, the heuristic continues to assign hosts into more than one timeslot, which is useful as a "simulation" mode for testing purposes or the like. Thus, in the simulation mode, and given the same inputs, the output provides a grouped ordering (do group one at time 1, then group two at time 2, etc.) of all field machines on which to execute the control action.

The technique of assigning hosts into a set of one or more timeslots in a greedy fashion based on some rank ordering of the hosts is a variant of a graph coloring heuristic. As is known, multi-coloring a graph is an NP-complete problem that attempts to define a minimum number of colors for the nodes of a graph where no adjacent nodes are assigned the same color. According to the present invention, the scheduling algorithm heuristic considers the hosts as "nodes" and the timeslots as "colors." A constraint set defines a subgraph, where all nodes contained in the particular subgraph have edges connecting them to all other nodes contained in that subgraph.

Scheduling Algorithm

The following is a representative and simplified description.

According to the algorithm, assign each host in the whole set a rank, as follows:

for each host:
   rank is initialized to 0
   for each constraint set that this host is in
     X=size of constraint set/number allowed at once in set
     rank=rank+X
for each host (some hosts may have non-zero rank):
   for each host with a phost (a prior host) that must precede it due to some rule
     (first, finish ranking for phost)
     Y=rank of phost
     rank=max(rank, (Y+1))

The first loop creates the first rank order, and the second loop alters the first rank order to create the second rank order. The first rank order output from the first loop is then applied as the input to the second processing loop. At the end of these steps, each host has a rank that roughly reflects how "constrained" that host is, and also how constraining that host is to other hosts.

The routine then sorts all hosts in descending rank order. Then, iterate over the hosts in this sorted order, finding timeslots (beginning at 0) for each host.

For a given host find the timeslot as follows:
1. slot=EARLIEST[host] (this is initialized to 0 for all hosts before beginning)
2. for each constraint set that host is in
   if that constraint is already "full" for this time slot:
     slot=slot+1
     goto step 2
3. slot value is now correct, set
4. for each fhost that follows this host in a precedence rule
   EARLIEST[fhost]=slot+1

Once this process has been completed for all hosts, the schedule is set.

To use this algorithm in a continuous fashion instead of lock-step scheduling, it is run frequently, with the results then simplified into two categories:
1. In slot 0: can be started now
2. In any other slot: cannot be started now In other words, by simply ignoring all distinctions other than whether a host would currently be in slot 0, the routine effectively asks at any given time "which hosts are safe to start right now?"

Concrete Rules, Results, and Performance

If a rule is specified as "no more than N % of a set at once", preferably this constraint is rounded down unless it would round to 0, in which case it will be rounded to 1.

The following are representative human-readable rules that may be used to define constraint sets:

No more than 1 host in a size 5 session agreement set at once.
   No more than 20% of the hosts in the entire release at once.
   No more than 20% of the edge servers at once.

Illustrative source code for the scheduling algorithm is set forth below (© 2002 Akamai Technologies, Inc.):

```python
import string
# goal: produce a scheduling order of hosts that maintains all
#       given constraints
class RuleInfo:
    def __init__(self, rfn, rifn):
        # rfn is the name of a "rules" file, the human-written file describing
        # constraints (format documented in rule_reader.pl)
        # rifn is the name of the rule_ips file, pregenerated from the rules
        # file and a network configuration file
        # some abbreviations used here:
        # rulename: the unique identifier for a given type of constraint
        #           (specified in the rules and rule_ips files)
        # gid: the unique identifier for a specific set applied to by
        #           some constraint
        #           (arbitrary integer, determined internally)
        self.__lastgid = -1
        # just a counter for generating gids
        self.noderanks = { }
        # keys are ip addresses, values are the rank of the node
        self.node_precedes = { }
        # ip addresses -> lists of ips that must precede the key
        self.node_follows = { }
        # ip addresses -> lists of ips that must follow the key
        self.bottoms = { }
        # ip addresses, if present and val is 1, then at end of prec chain
        self.node_g_memberships = { }
        # keys are ip addresses, values are lists of gids denoting
        # constraint sets that those ips belong in
        self.g_sizes = { }
        # keys are gids, values are the sizes of the constraint sets
        self.g_rates = { }
        # keys are gids, values are the most at once allowed in that group
        # the following two dicts are mostly just as intermediates for
        # generating some of the above
        self.ri_info = { } # rulename -> list of lists of ips
        self.r_info = { } # rulename -> cond_string
        # first, read the rule_ips file, get the full list of ips
        # and the list of lists of ips for each rule
        rifd = open(rifn)
        ri_lines = rifd.readlines( )
        for line in ri_lines:
            tokens = string.split(line)
            rulename, data = tokens[0], tokens[1:]
            if rulename == "all_hosts": # magic allips rule
                for ip in data:
                    self.noderanks[ip] = 0
                    self.node_g_memberships[ip] = [ ]
            else:
                self.ri_info[rulename] = self.__pound_break(data)
        rifd.close( )
        # now we have all of the ips
        # read the rules file in order to get the constraint data
        rfd = open(rfn)
        for line in rfd:
            tokens = string.split(line)
            self.r_info[tokens[0]] = tokens[-1]
        rfd.close( )
        for rulename, iplists in self.ri_info.items( ):
            for iplist in iplists:
                gid = self.__nextgid( )
                self.g_sizes[gid] = len(iplist)
                self.g_rates[gid] = self.__get_rate(rulename, iplist)
                precs = self.__get_precedents(rulename)
                cur_prec = self.node_precedes.keys( )
                for ip in iplist:
                    self.node_g_memberships[ip].append(gid)
                    if ip not in cur_prec:
                        self.bottoms[ip] = 1
                    for pip in precs:
                        curprecs = self.node_precedes.get(ip, [ ])
                        curprecs.append(pip)
                        self.node_precedes[ip] = curprecs
                        curfollow = self.node_follows.get(pip, [ ])
                        curfollow.append(ip)
                        self.node_follows[pip] = curfollow
                        self.bottoms[pip] = 0
        # now we have all constraint rates, memberships, and precedences
        # ready to start ranking!
        # we will order all IPs in descending order by the number of
        # constraint sets that they are present in (roughly)
        # this will cause us to try to schedule the most constrained IPs first
        for node in self.noderanks.keys( ):
            con = 0
            for gid in self.node_g_memberships[node]:
                con = con + (self.g_sizes[gid]/self.g_rates[gid]) + 1
                # the bigger the set (or slower the rate) the more
                # constraining it is...
            self.noderanks[node] = con
        # now we have the ranking purely by set memberships
        # modify to take precedence into account
        for node in self.noderanks.keys( ):
            self.__fix_rank_precedence(node)
        # now we have our final rankings
        # produce a flat sorted list of ips from the rankings
        val_d = { }
        for val in self.noderanks.values( ):
            val_d[val] = [ ]
        for ip, con in self.noderanks.items( ):
            val_d[con].append(ip)
        vals = val_d.keys( )
        vals.sort( )
        vals.reverse( )
        self.sorted_ips = [ ]
        for val in vals:
            for ip in val_d[val]:
                self.sorted_ips.append(ip)
        # we now have our ordered list of IPs
        # put them in the schedule
        self.schedule( )
        # we now have a list of lists of ips in self.result
        # these are our ordered steps for installation
    def schedule(self):
        # we should never take more steps to install than 1+highest_rank
        maxsteps = 1+max(self.noderanks.values( ))
        scheduled = { } # int -> list of ips in that step (0-indexed)
        for i in range (maxsteps):
            scheduled[i] = [ ] # initialize to no ips scheduled
        setsched = { } # gid -> array of int of num scheduled at indexed step
        for gid in self.g_sizes.keys( ):
            setsched[gid] = __zeros(maxsteps) # nothing scheduled yet
        # earliest is used for precedence management
        earliest = { } # ip -> slot
        # ready, set, go.
        for ip in self.sorted_ips:
            slot = earliest.get(ip, 0)
            found = 0
            while not found:
                # find the first time slot for which all applicable
                # constraint sets allow another host to be scheduled
                for constraint in self.node_g_memberships[ip]:
                    capacity = self.g_rates[constraint]
                    if setsched[constraint][slot] == capacity:
                        # already full at this slot
                        slot = slot + 1
                        break
                else:
                    found = 1
            # found our slot, do bookkeeping
            scheduled[slot].append(ip)
            for constraint in self.node_g_memberships[ip]:
                setsched[constraint][slot] = setsched[constraint][slot] + 1 for fnode in self.node_follows.get(ip, [ ]):
                earliest[fnode] = max(earliest.get(fnode, 0), slot+1)
        # done, now just cleanup and result formatting
        self.setsched = setsched
        self.result = [ ]
```

-continued

```
        steps = scheduled.keys( )
        steps.sort( )
        for step in steps:
            val = scheduled[step]
            if val:
                self.result.append(val)
        # finis
    def __get__precedents(self, rulename):
        # given a rulename and an already populated self.r_info,
        # return list of ips that must precede all ips in this rule
        res = [ ]
        cond = self.r__info[rulename]
        if cond[0] != "__": # not a prec rule
            return res
        prec = cond[1:]
        if prec == "__": # nop rule
            return res
        for iplist in self.ri__info[prec]:
            for ip in iplist:
                res.append(ip)
        return res
    def __get__rate(self, rulename, iplist):
        # given a rulename, list of ips in a set of that rule,
        # and a populated self.r_info, return the maximum number of
        # hosts in that iplist that may be scheduled at once
        size = len(iplist)
        cond = self.r__info[rulename]
        if cond[0] == "__": # prec rule, max size
            return size
        cond_type, cond_val = cond[0], cond[1:]
        if cond_type == 'n':
            return int (cond__val)
        elif cond_type == 'p':
            return max(int((float(cond__val) / 100) * size), 1)
        else:
            raise "unknown condition value %s" % cond
    def __nextgid(self):
        # just a simple counter/generator
        self.__lastgid = self.__lastgid + 1
        return self.__lastgid
    def __pound__break(self, plist):
        # given a list of strings, some of which are "#",
        # return a list of lists, breaking on the "#" items
        res = [ ]
        tmp = [ ]
        while plist:
            next, plist = plist[0], plist[1:]
            if next == '#':
                if tmp:
                    res.append(tmp)
                    tmp = [ ]
            else:
                tmp.append(next)
        if tmp:
            res.append(tmp)
        return res
    def __fix__rank__precedence(self, node):
        # re-rank nodes from here upward on the precedence chain
        # in order to force preceding nodes to have higher ranks
        for fnode in self.node__follows.get(node, [ ]):
            self.noderanks[node] = max(self.noderanks[node],
                                       (self.noderanks[fnode]+1))
        for pnode in self.node__precedes.get(node, [ ]):
            self.__fix__rank__precedence(pnode)
def __zeros(lenz):
    # because we stopped using Numeric, but still need this
    r = [ ]
    for i in range(lenz):
        r.append(0)
    return r
def main(rfn, rifn):
    ri = RuleInfo(rfn, rifn)
    ln = [ ]
    for step in ri.result:
        ln.append(len(step))
    print ln
    print len(ri.result)
```

```
if __name__ == '__main__':
    import sys
    main(sys.argv[1], sys.argv[2])
```

Datastore Interface

The Change Coordinator also uses structured, embedded, fast, highly available storage. Data that should reside in this storage includes, but is not limited to: the parameters that can fully describe each release, and the state of hosts with regard to install status.

Installer Component Design Details

Figure 8:
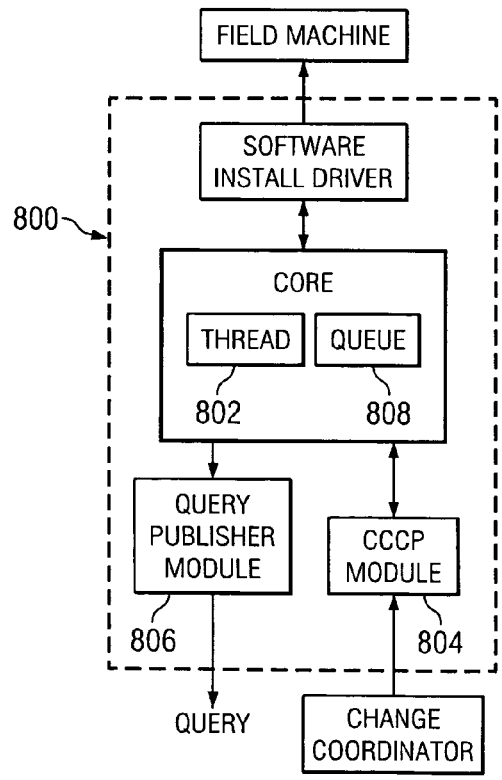
FIG. 8 illustrates a representative Installer component of the software management system of the present invention.

As noted above, the primary purposes of the Installer component include: installing software to field machines, and communications with the Change Coordinator (CC) component. The Installer component 800 preferably has three subsystems as illustrated in FIG. 8: Installer will maintain a thread pool 802, each member of which is capable of driving software installs to field machines; Installer will communicate with whichever Change Coordinator contacts it, using the communication subsystem 804 via Change Coordinator Communication Protocol (CCCP) over the secure, encrypted TCP connection (as has been described); and Installer will publish data to the query mechanism for monitoring purposes using a publishing mechanism 806.

The Installer preferably maintains and monitors the thread pool 802 and a queue 808. At the request of a Change Coordinator, a given IP/release pair will be inserted into the queue for installation. Whenever the thread pool is not at its maximum capacity and the queue is not empty, the next item will be removed from the queue and an installer thread will be created for it. The Installer preferably has resident on it all of the current software components that are contained in any valid release, as well as definitions of each of those releases. A means of securely and efficiently transferring the data and bundles to the Installer is assumed to exist. Installer threads 802a–n perform the actual software installation using an application deployment routine optimized for this sort of usage model. Substantial detailed feedback about install status preferably is reported back into the main Installer program. The Installer shall also be able to run audits against machines after running installs to them. The output of the audits must be reported to the CC and possibly also directly into the query mechanism for alert-raising purposes. Preferably, configuration parameters such as the maximum number of concurrent install threads will be runtime-configurable without needing to restart the Installer program.

As noted above, the Installer interacts with the Change Coordinator. These components may communicate using a token-based wire protocol, although RPC is preferred. In particular, the communication may use an XML-RPC protocol over a secure, encrypted TCP socket. The communication content typically includes: instructions from CC to Installer for Installer configuration parameters, instructions from CC to Installer to install a given host to a given release; and feedback from Installer to CC on install progress/success/failure/failure-reasons.

Install Reporter (IR) and Install Listener (IL) Subcomponent Design

The primary purpose of this pair of components is to provide reporting of host install states to the Change Coordinators. The two components taken together may be seen as one system. The basic design is as follows: the IL listens on given UDP and TCP ports on chosen servers; the IR runs regularly and briefly on every field machine; when invoked, the IR sends a message to an arbitrarily-chosen host that is running IL; and the IL receiving the message outputs the message for use by the Change Controller. Communication between the two components preferably is one-way; an IR only sends messages, and an IL only receives them.

The IR component preferably is frequently invoked and short-lived. It reads a configuration file to gain the following information: protocol version being used (this may be hard-coded instead), and DNS hostname to which datagrams are sent. When invoked, the following sequence occurs: a first configuration file is read for configuration information, a second configuration file is read for data content information, IR decides randomly whether to use TCP or UDP, a datagram is sent to the IL hostname read from the first configuration file, and the component exits with an exit status of 0.

The IL component runs in a fairly standard model. It is preferably long-lived and runs on arbitrary field hosts. To keep the data transfer model simple, however, preferably IL runs on CC hosts. This component is constantly bound to given UDP and TCP ports. A simplified version of this component writes its output to files in a given directory, although more sophisticated means of communication may be used. Upon receiving a datagram from a host running IR, the data is presented into the current output method. This component provide data into the query mechanism. The following may be published: approximate number of reports received per minute, and amount of time since last output file rotation.

The Change Coordinator is responsible for the receiving half of the following output method, and for interpreting the body of the IR reports. Some information should probably be published to the query mechanism about this data by the CC, such as: datagrams received where the apparent source IP differs from the IP in the body; datagrams received where the content is ill-formed; and datagrams being received with an unknown protocol version.

Applications

One distributed computing environment in which the present invention may be implemented is a content delivery network (CDN). It is known to deliver digital content (e.g., HTTP content, streaming media and applications) using an Internet content delivery network (CDN). A CDN is a network of geographically distributed content delivery nodes that are arranged for efficient delivery of content on behalf of third party content providers. Typically, a CDN is implemented as a combination of a content delivery infrastructure, a request-routing mechanism (preferably based in DNS), and a distribution infrastructure. The content delivery infrastructure usually comprises a set of "surrogate" origin servers that are located at strategic locations (e.g., Internet network access points, Internet Points of Presence, and the like) for delivering content to requesting end users. The request-routing mechanism allocates servers in the content delivery infrastructure to requesting clients in a way that, for web content delivery, minimizes a given client's response time and, for streaming media delivery, provides for the highest quality. The distribution infrastructure consists of on-demand or push-based mechanisms that move content from the origin server to the surrogates. An effective CDN serves frequently accessed content from a surrogate that is optimal for a given requesting client. In a typical CDN, a single service provider operates the request-routers, the surrogates, and the content distributors. In addition, that service provider establishes business relationships with content publishers and acts on behalf of their origin server sites to provide a distributed delivery system.

More generally, the present invention is useful in any distributed networking environment in which it is required to install software on field machines that are interdependent and/or that provide redundancy to each other. Typically, field machines are associated with one or more constraint sets, as has been previously described.

Variants

A skilled artisan will appreciate that the Install Reporter and Install Listener components may be omitted without impacting the basic functionality of the system. The Change Coordinator database stores the known install status of every field machine and a last time that the status was verified or known. When the IR and IL routines are omitted, the Change Coordinator status database can be populated in other ways, e.g., by having an Install Server simply report back each successful installation (which information may be provided anyway). The IR routine provides an optimization to provide the system with information that it might not otherwise obtain, namely, that a particular machine is out-of-date. This is particularly important in the case where the field machine has been disconnected from the network for a long time period.

Having described my invention, what I claim is as follows.

We claim:

1. A method of scheduling hosts to timeslots to enable a software install in a distributed computer network, wherein given hosts are associated with one or more potentially overlapping constraint sets and/or have given precedent relationships, comprising:
   maintaining a given state of a set of hosts;
   generating a first rank order of the hosts by assigning to each host a cumulative value of all constraint sets in which that host is contained, wherein a constraint set is associated with a group of hosts that are interdependent or provide redundancy in the distributed computer network;
   altering the first rank order to accommodate precedent relationships, if any, to generate a second rank order of the hosts;
   executing a given heuristic against the second rank order to generate a schedule; and
   performing a software install on the hosts according to the schedule.

2. The method as described in claim 1 wherein the given heuristic assigns hosts into a set of one or more timeslots in a greedy fashion.

3. The method as described in claim 1 wherein hosts are pulled from the second rank order and pushed into a first timeslot until a given constraint is violated.

4. The method as described in claim 3 further including the step of continuing to pull hosts from the second rank order and pushing the hosts into a set of one or more additional timeslots until all hosts have been assigned to a given timeslot.

5. The method as described in claim 1 wherein executing the given heuristic identifies a subset of the hosts against which the software install may be safely executed at a given time.

6. The method as described in claim 1 wherein the distributed computer network is a content delivery network (CDN).

7. A method of scheduling hosts to timeslots to enable a software install in a distributed computer network, wherein given hosts are associated with one or more potentially overlapping constraint sets and/or have given precedent relationships, comprising:

maintaining a given state of a set of hosts;

generating a rank order of the hosts by assigning to each host a cumulative value of all constraint sets in which that host is contained, wherein a constraint set is associated with a group of hosts that are interdependent or provide redundancy in the distributed computer network;

executing a given heuristic against the rank order to generate a schedule, wherein the given heuristic assigns hosts into a set of one or more timeslots in a greedy fashion; and performing a software install on the hosts according to the schedule.

8. The method as described in claim 7 wherein hosts are pulled from the rank order and pushed into a first timeslot until a given constraint is violated.

9. The method as described in claim 8 further including the step of continuing to pull hosts from the rank order and pushing the hosts into a set of one or more additional timeslots until all hosts have been assigned to a given timeslot.

10. The method as described in claim 7 wherein executing the given heuristic identifies a subset of the hosts against which the software install may be safely executed at a given time.

11. The method as described in claim 7 wherein the distributed computer network is a content delivery network (CDN).

12. A method of scheduling hosts to timeslots to enable a software install in a distributed computer network, wherein given hosts are associated with one or more potentially overlapping constraint sets and/or have given precedent relationships, comprising:

maintaining a given state of a set of hosts;

generating a rank order of the hosts by assigning to each host a cumulative value of all constraint sets in which that host is contained;

assigning hosts into a set of timeslots in a greedy fashion to generate a schedule, wherein the hosts are assigned by executing a given heuristic against the rank order that pulls hosts from the rank order and pushes the hosts into a first timeslot until a given constraint is violated; and performing a software install on the hosts according to the schedule.

13. The method as described in claim 12 wherein the step of executing the given heuristic further includes the step of continuing to pull hosts from the rank order and pushing the hosts into a set of one or more additional timeslots until all hosts in the rank order have been assigned to a given timeslot in the set of timeslots.

14. The method as described in claim 12 wherein the distributed computer network is a content delivery network (CDN).

* * * * *